US011235263B2

(12) United States Patent
Spiridonov et al.

(10) Patent No.: US 11,235,263 B2
(45) Date of Patent: Feb. 1, 2022

(54) SEPARATOR SYSTEM WITH VISCOSITY-BASED SAND-LEVEL SENSOR

(71) Applicant: ENERCORP SAND SOLUTIONS INC., Calgary (CA)

(72) Inventors: Nikolay Spiridonov, Magnolia, TX (US); Rory Nagge, Calgary, CA (US); Tien Nguyen, Calgary, CA (US)

(73) Assignee: ENERCORP ENGINEERED SOLUTIONS INC., Calgary (CA)

(*) Notice: Subject to any disclaimer, the term of this patent is extended or adjusted under 35 U.S.C. 154(b) by 10 days.

(21) Appl. No.: 16/711,561

(22) Filed: Dec. 12, 2019

(65) Prior Publication Data
US 2020/0188817 A1   Jun. 18, 2020

Related U.S. Application Data

(60) Provisional application No. 62/779,708, filed on Dec. 14, 2018.

(51) Int. Cl.
| | | |
|---|---|---|
| *B01D 21/26* | (2006.01) | |
| *B01D 21/30* | (2006.01) | |
| *G01H 3/00* | (2006.01) | |
| *G01N 11/10* | (2006.01) | |
| *G01F 15/08* | (2006.01) | |

(52) U.S. Cl.
CPC .......... *B01D 21/30* (2013.01); *B01D 21/267* (2013.01); *G01H 3/00* (2013.01); *G01N 11/10* (2013.01); *G01F 15/08* (2013.01)

(58) Field of Classification Search
CPC ...... B01D 21/267; B01D 21/32; B01D 45/12; B01D 2221/04; G01H 3/00
See application file for complete search history.

(56) References Cited

U.S. PATENT DOCUMENTS

| | | | | |
|---|---|---|---|---|
| 2004/0020860 | A1* | 2/2004 | Schmigel | B01D 21/245 210/744 |
| 2012/0160103 | A1* | 6/2012 | Suppiah | B01D 19/0036 95/249 |
| 2016/0059153 | A1* | 3/2016 | Smith | B01D 21/2483 210/744 |
| 2017/0198536 | A1* | 7/2017 | Song | E21B 41/0092 |
| 2020/0116004 | A1* | 4/2020 | Gamarra | B01D 21/265 |

FOREIGN PATENT DOCUMENTS

| | | | | |
|---|---|---|---|---|
| WO | WO-2019241326 A1 | * | 12/2019 | ............. E21B 43/34 |
| WO | WO-2020076524 A1 | * | 4/2020 | ............. E21B 43/34 |

OTHER PUBLICATIONS

Rheonics—SRV Wide Viscosity Range Inline Process Viscometer—accessed Feb. 2021 (Year: 2021).*
Rheonics—DVP Ultra High Accuracy Simultaneous Density and Viscosity Metering—accessed Feb. 2021 (Year: 2021).*

* cited by examiner

*Primary Examiner* — Bradley R Spies
(74) *Attorney, Agent, or Firm* — MH2 Technology Law Group LLP

(57) ABSTRACT

A separation system and method, of which the system includes a separation device comprising a mixed fluid inlet, a first outlet, and a second outlet, a tank coupled to the second outlet and configured to receive a solid from the separation device via the second outlet, and a solids-level sensor extending through the tank and positioned at an elevation above a bottom of the tank. The solids-level sensor is configured to detect a viscosity of a material within the tank at the elevation.

19 Claims, 5 Drawing Sheets

SEPARATOR SYSTEM WITH VISCOSITY-BASED SAND-LEVEL SENSOR

CROSS-REFERENCE TO RELATED APPLICATIONS

This application claims priority to U.S. Provisional Patent Application No. 62/779,708, which was filed on Dec. 14, 2018, and is incorporated herein by reference in its entirety.

BACKGROUND

Hydraulic fracturing is a well-treatment process in which preferential flowpaths for hydrocarbons are established in a subterranean rock formation by pumping fluid at high pressure into a well to initiate fractures in the rock formation. The fluid is predominately water, but may also include solids, such as sand or ceramic proppants, which at least partially fill the fractures and maintain the preferential flowpaths.

When hydrocarbons or other fluids are produced/recovered from the well, it may be desirable to remove sand or other solids from the produced fluid. A separator system is employed to perform this function. One type of separator system used for this application is a cyclone separator. The cyclone separator operates at steady state by imparting a generally helical flowpath in a fluid. In such a flow, the denser particulate matter drops out into a hopper, because of its greater density, while the less-dense liquids and gases may flow inward and up through an outlet.

As the sand separator operates, sand is continuously deposited into the hopper, and thus the high pressure vessel is slowly filled with sand. To avoid overfilling the hopper with sand, the hopper is periodically emptied. The duration between emptying the hopper is typically determined by experience and/or guesswork, as the contents of the hopper are generally not known prior to emptying.

SUMMARY

Embodiments of the disclosure may provide a separation system that includes a separation device comprising a mixed fluid inlet, a first outlet, and a second outlet, a tank coupled to the second outlet and configured to receive a solid from the separation device via the second outlet, and a solids-level sensor extending through the tank and positioned at an elevation above a bottom of the tank. The solids-level sensor is configured to detect a viscosity of a material within the tank at the elevation.

Embodiments of the disclosure may also provide a sand separation method that includes introducing a mixed fluid comprising a solid and a fluid to a separation device, separating the solid from the fluid using the separation device, directing the fluid from the separation device to a fluid outlet, receiving the solid separated from the fluid into a tank, measuring a viscosity of a material within the tank that is in contact with a solids-level sensor positioned at an elevation above a bottom of the tank, detecting that the material is the solids based on the viscosity, and causing the tank to be emptied in response to detecting that the material is the solids.

Embodiments of the disclosure may also provide a separation system that includes a cyclonic separation device including a mixed fluid inlet, a first outlet, and a second outlet, the cyclonic separation device being configured to receive a mixed fluid through the inlet, and to provide a separated fluid through the first outlet. The system also includes a tank coupled to the second outlet and configured to receive a solid from the separation device via the second outlet. The tank includes a high-pressure vessel configured to contain a pressure of at least about 5,000 psi. The tank is configured to be filled at least partially with fluid from the separation device, and, when the fluid reaches a connection with the second outlet, the separation device is configured to provide substantially only solids into the tank, such that a level of solids in the tank rises over time. The system further includes a first solids-level sensor extending through the tank and positioned at a first elevation above a bottom of the tank. The first solids-level sensor is configured to detect a viscosity of a material within the tank at the first elevation. The first solids-level sensor includes a vibratory sensor including a vibrating element having a resonant frequency that changes depending on the viscosity of the material within the tank, and the first solids-level sensor is configured to provide a signal representing the viscosity of the material in the tank at the first elevation. The system also includes a controller in communication with the first solids-level sensor and configured to cause the tank to be emptied in response to the signal representing that the material is sand.

BRIEF DESCRIPTION OF THE DRAWINGS

The present disclosure may best be understood by referring to the following description and accompanying drawings that are used to illustrate embodiments of the invention. In the drawings.

DETAILED DESCRIPTION

Figure 1A:
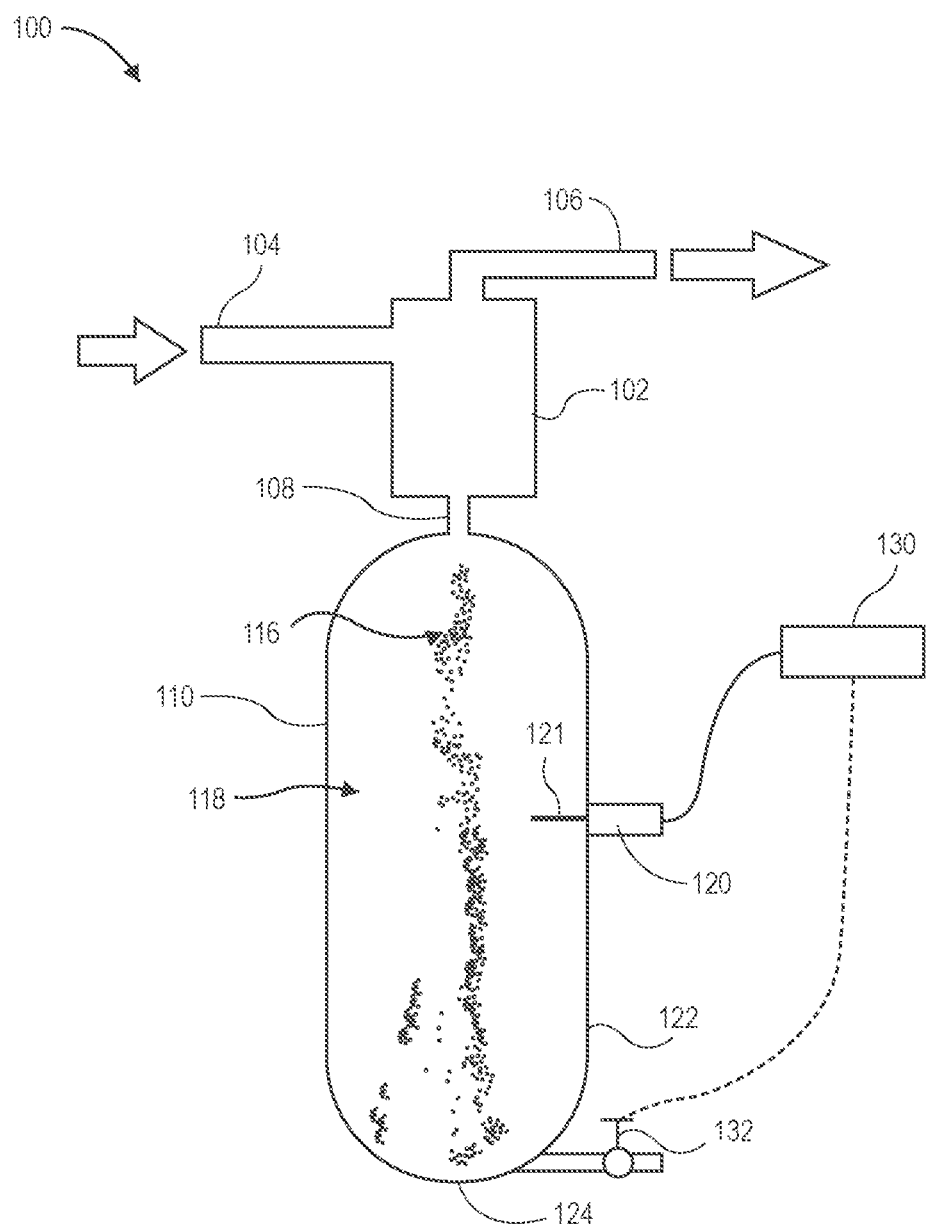
FIG. 1A illustrates a simplified, schematic view of a separation system including a tank and a solids-level sensor, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

FIG. 1A illustrates a schematic view of a separation system 100, according to an embodiment. The separation system 100 may be configured to separate particulate matter, such as sand, from one or more fluids such as water, liquid and/or gaseous hydrocarbon, or the like. Although the system 100 is described herein generally with reference to separating sand from fluid (e.g., water and/or hydrocarbon), it will be appreciated that the system 100 may be employed to separate other types of particulates from any type of fluid.

The system 100 includes a separation device 102, which may be a cyclonic separator or another type of separator. The separation device 102 may be configured to swirl a mixture of a solid (e.g., particulate matter) and fluid and thereby separate the solid from the fluid based on density. The separation device 102 includes a mixed fluid inlet 104, a first outlet 106, and a second outlet 108. The mixed fluid (e.g., sand and water/hydrocarbons) may be received into the separation device 102 through the mixed fluid inlet 104. The separation device 102 may then separate at least a portion of the solid from the fluid. Generally solid-free fluid (or at least fluid with a reduced sand/other solid content as compared to the mixed fluid at the inlet 104) may exit the separation device 102 via the first outlet 106. Solid particulate matter ("solids") 116 and/or fluid 118 may exit the separation device 102 via the second outlet 108.

A tank or "hopper" 110 may be coupled to the second outlet 108, e.g., such that the separation device 102 is positioned on and supported by the tank 110. The tank 110 may be a high-pressure vessel configured to contain fluids and/or solids at pressures above 5,000 psi, above 10,000 psi, or more. The tank 110 may thus be configured to receive the solids 116 and/or fluids 118 from the second outlet 108 of the separation device 102. For example, during a transient, start-up phase, the tank 110 may be generally empty, and thus both fluid 118 and solids 116 may be received from the separation device 102 via the second outlet 108. Eventually, the tank 110 may fill predominately with the fluid 118, as shown in FIG. 1A. At this point, additional fluid 118 may not flow from the second outlet 108 of the separation device 102 into the tank 110, but may instead exit the separation device 102 via the first outlet 106, while the separated solids 116 may continue to be received into the tank 110 via the second outlet 108 and settle to the bottom of the tank 110, as shown.

The system 100 may also include a solids-level sensor 120. The solids-level sensor 120 may be positioned through a sidewall 122 of the tank 110, e.g., at an elevation that is separated from a bottom 124 of the tank 110. The elevation may represent a point where the tank 110 is nearly full, such that the tank 110 may be ready, or nearly ready, to be emptied. For example, the elevation may be between about ⅓ and about ⅘ of the height of the tank 110 from its bottom 124. In various specific examples, the point where the solids-level sensor 120 is positioned may be about ½, about ¾, about ⅔, or about ¾ of the height up from the bottom 124 of the tank 110. The solids-level sensor 120 may extend through the sidewall 122, and may be in communication with the contents of the tank 110.

The solids-level sensor 120 may be configured to detect a physical characteristic of the material of the tank 110 with which it is in contact, e.g., specifically at the elevation within the tank 110. For example, the solids-level sensor 120 may be a viscosity sensor, which may have a vibratory member (e.g., a tuning fork or paddle) 121 that is configured to vibrate. The solids-level sensor 120 may be configured to measure the resonant frequency of the vibratory member 121, and thereby determine the viscosity of the material in which the vibratory member 121 is embedded within the tank 110.

The fluid 118 content of the tank 110 may have a significantly different viscosity than the solids 116 in the tank 110. Accordingly, while the vibratory member 121 of the solids-level sensor 120 is positioned within fluid 118, the solids-level sensor 120 may generate signals representing the that the viscosity of the material in the tank 110 that is being measured is fluidic. When the solids-level sensor 120 is embedded at least partially in the solids 116 (or another solids/particulate matter), the signal generated by the solids-level sensor 120 may represent that the viscosity is significantly different (e.g., higher) than when it was measuring fluid, indicating that that the sand level has reached the elevation at which the solids-level sensor 120 is positioned.

In some embodiments, the solids-level sensor 120 may be a MIVI sensor that provides a signal with a voltage proportional to the resonant frequency of a vibratory structure (e.g., a paddle or fork). The resonant frequency is proportional to the viscosity of the medium in which the vibratory structure is disposed, and thus the signal allows for a calculation of the viscosity. Further, the solids-level sensor 120 may be mounted to a flange, which may be welded or otherwise secured to the exterior of the tank 110. In at least one specific embodiment, the solids-level sensor 120 may be provided by SOFRASER®.

The system 100 may further include a controller 130 that is in communication with the sensor 120 and configured to receive signals therefrom. The controller 130 may be or include a programmable logic controller, microcontroller, a general-purpose computer with appropriate data acquisition hardware and software, etc. The signals from the solids-level sensor 120 may thus be received by the controller 130. The controller 130 may interpret the signals, e.g., determining the viscosity value measured by the sensor 120. The controller 130 may then display the viscosity value, or an indication of a type of material being measured by the sensor (e.g., fluid or sand). Thus, the sensor 120 is configured to provide a signal that enables the controller 130 to distinguish between when the solids-level sensor 120 is measuring the viscosity of fluid 118 and when it is measuring the viscosity of solids 116, thereby enabling an operator to determine when the solids 116 have reached the elevation of the solids-level sensor 120, e.g., without resorting to weighing the tank 110, although embodiments are envisioned in which weight is used as a factor in addition to the signal from the solids-level sensor 120.

In some embodiments, the controller 130 may be configured to determine a difference between a transient spike in the viscosity signal (e.g., from noise, temporary obstruction of the vibratory member of the solids-level sensor 120, etc.), and true changes in the viscosity of the material in the tank 110 at the elevation of the solids-level sensor 120. This determination may be based on time, duration, or the particular value of the viscosity measurement and/or differential between two viscosity measurements.

In at least one embodiment, the system 100 may also include a blowdown valve 132, which may be coupled to the tank 110. When open, the blowdown valve 132 may allow for evacuation of the sand (or other solids, as well as fluids) in the tank 110, e.g., emptying of the tank 110. When closed, the blowdown valve 132 may not permit evacuation of material therethrough. The blowdown valve 132 may include an actuator that is controlled by the controller 130. Accordingly, the controller 130 may automatically respond to the sensor 120 measuring the viscosity of solids/sand by opening the blowdown valve 132, thereby causing blowdown. In another embodiment, the valve 132 may be manually operated, and thus the controller 130 may cause a blowdown by signaling the solids level to a user, stopping flow of fluid into the separation device 102, or taking other actions intended to bring about a blowdown of the tank 110.

Figure 1B:
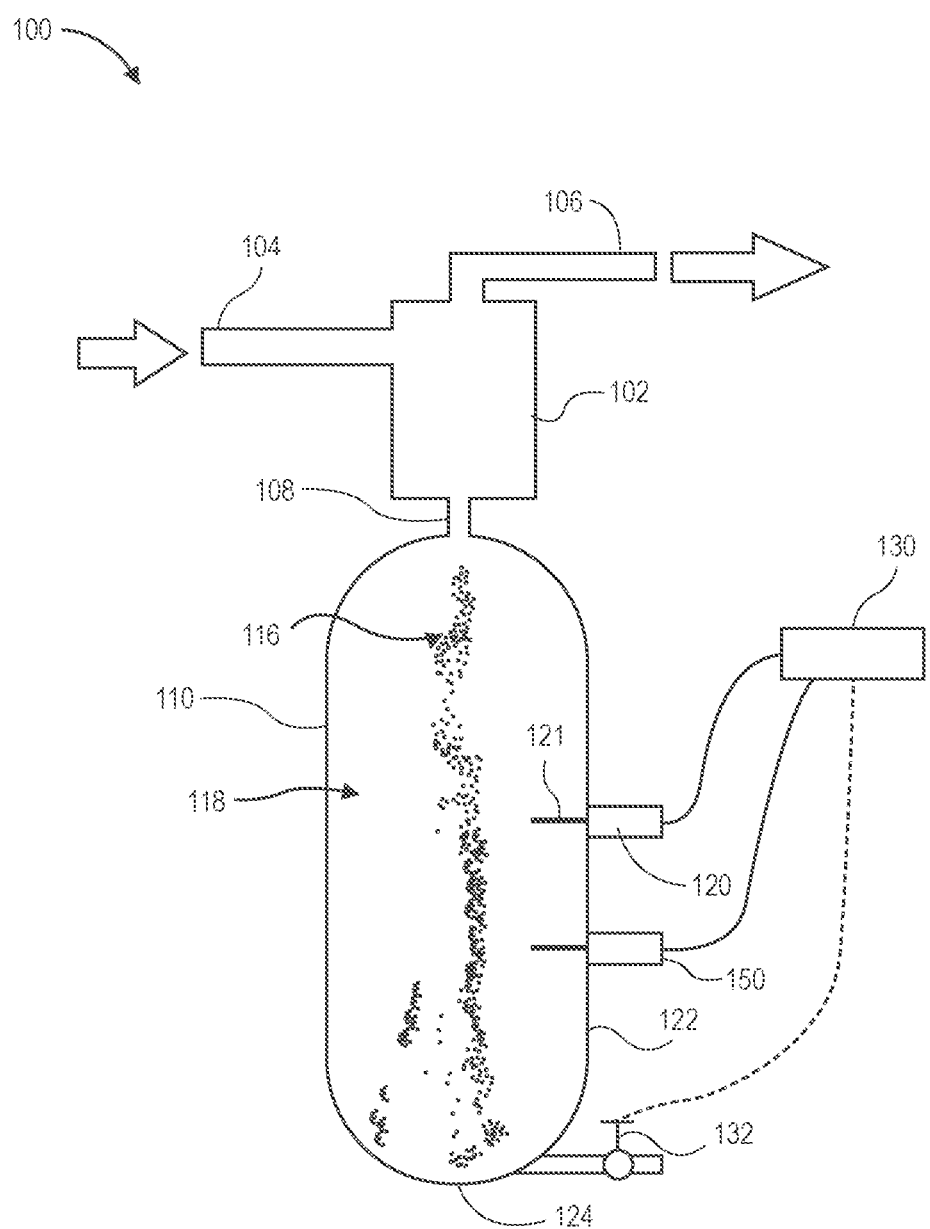
FIG. 1B illustrates a simplified, schematic view of the separation system including the tank and a second solids-level sensor, according to an embodiment.

In some embodiments, two or more solids-level sensors may be used. FIG. 1B illustrates a simplified, schematic view of the sand separation system 100 according to such an embodiment. As shown, the system 100 includes the first solids-level sensor 120, as described above, as well as a second solids-level sensor 150. For example, the first solids-level sensor 120 may be positioned at a first elevation (as described above), and the second solids-level sensor 150 may be positioned at a second elevation that is below the first elevation. This may provide two indications of solids level within the tank 110. In some embodiments, three or more solids level sensors could be used, for similar purposes. The provision of two (or more) solids-level sensors 120, 150 may provide system redundancy, or may be used to provide an early warning when the solids reach the second, lower solids-level sensor 150, before reaching the first, higher solids-level sensor 120, where the solids level may be full and require immediate blowdown or stoppage to avoid flooding the separation device 102.

In another embodiment, multiple solids-level sensors may be positioned at the same elevation or at multiple elevations, which may also provide redundancy, e.g., to avoid misinterpreting noise as an indication of solids level. Furthermore, two or more solids-level sensors may be positioned at the same elevation, but separated circumferentially apart, so as to ensure that sand is not filling on a single side of the tank 110 and thereby giving an early indication of being full of sand.

Figure 2:
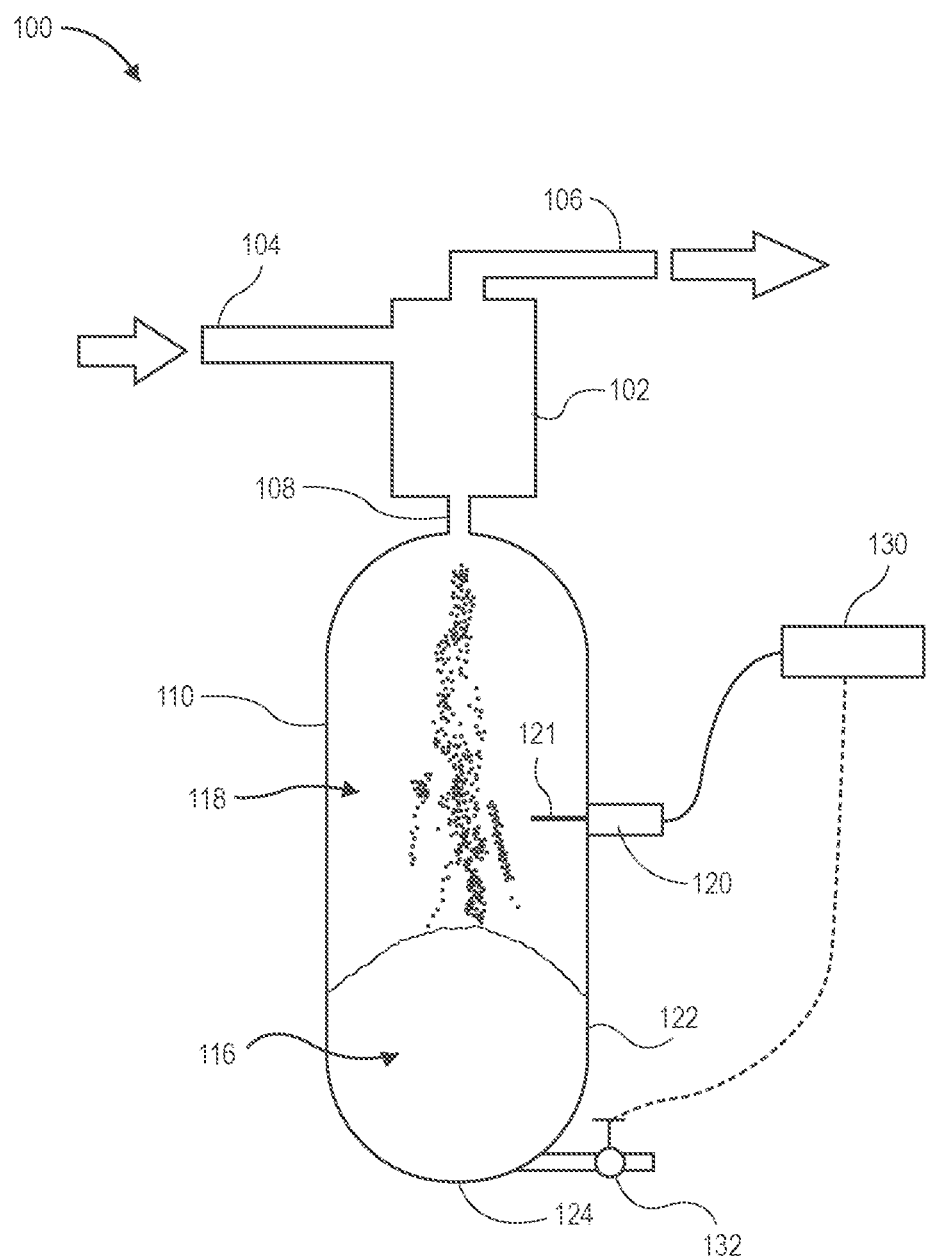
FIG. 2 illustrates a simplified, schematic view of the separation system with the tank partially full of sand (or another particulate matter), according to an embodiment.

FIG. 2 illustrates a simplified schematic view of the system 100 including the separation device 102, the tank 110, and the solids-level sensor 120, according to an embodiment. At this stage of operation, the solids 116 now occupy an area adjacent to the bottom 124 of the tank 110. The upper edge of the solids 116 may, however, be below the elevation of the solids-level sensor 120, and thus the solids-level sensor 120 may continue to read the viscosity of the fluid 118. In an example, the viscosity reading may be generally stable at a relatively low viscosity, e.g., between about 1 centiStoke (cSt) and about 100 cSt, about 10 cSt and about 80 cSt, or about 30 cSt and about 70 cSt. For example, the reading may be stable at about 50 cSt (or within a prescribed range that may depend on the application). The reading of the viscosity at this point-in-time may be generally constant, as the transient, fill-up phase of operation of the system 100 may have already been completed, such that steady-state operation is underway.

Figure 3:
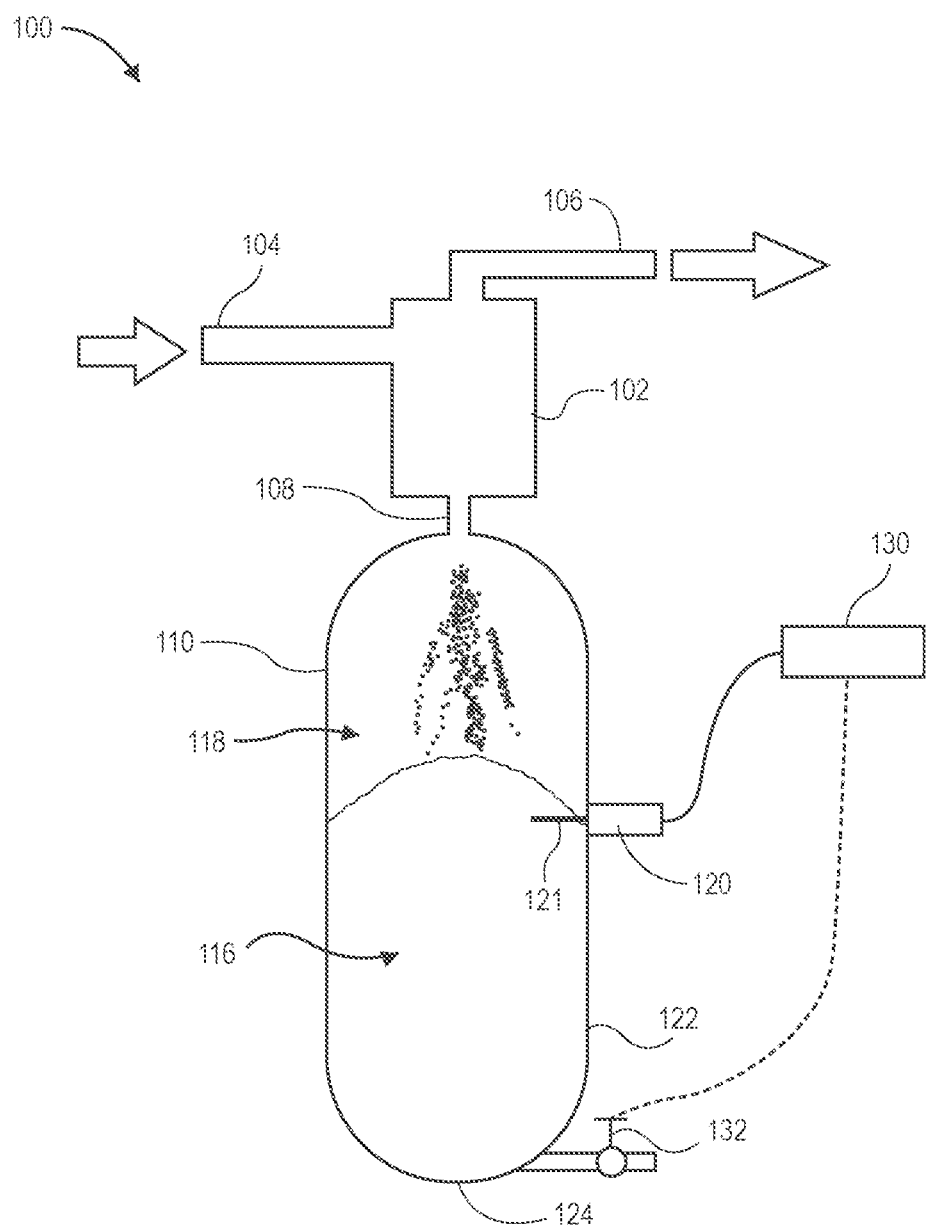
FIG. 3 illustrates a simplified, schematic view of the separation system with the tank filled with sand up to the solids-level sensor, according to an embodiment.

Referring now to FIG. 3, the solids 116 may continue filling the tank 110 until the level of the solids 116 reaches the elevation of the solids-level sensor 120. At this point, the viscosity detected by the solids-level sensor 120 may change, e.g., significantly increase, such as by one or more orders of magnitude. In some examples, when the solid reaches the level of the solids-level sensor 120, the solids-level sensor 120 may read a viscosity of between about 1,000 cSt and about 30,000 cSt, about 5,000 cSt and about 25,000 cSt, or about 10,000 cSt and about 20,000 cSt. For example, the measured viscosity may represent a solid when the sensor 120 measures reading reaches about 15,000 cSt (or within a prescribed range that may depend on the application). Thus, this change in viscosity may be interpreted by the controller 130 or a user as an indication that the solids 116 in the tank 110 has reached the elevation of the solids-level sensor 120.

Figure 4:
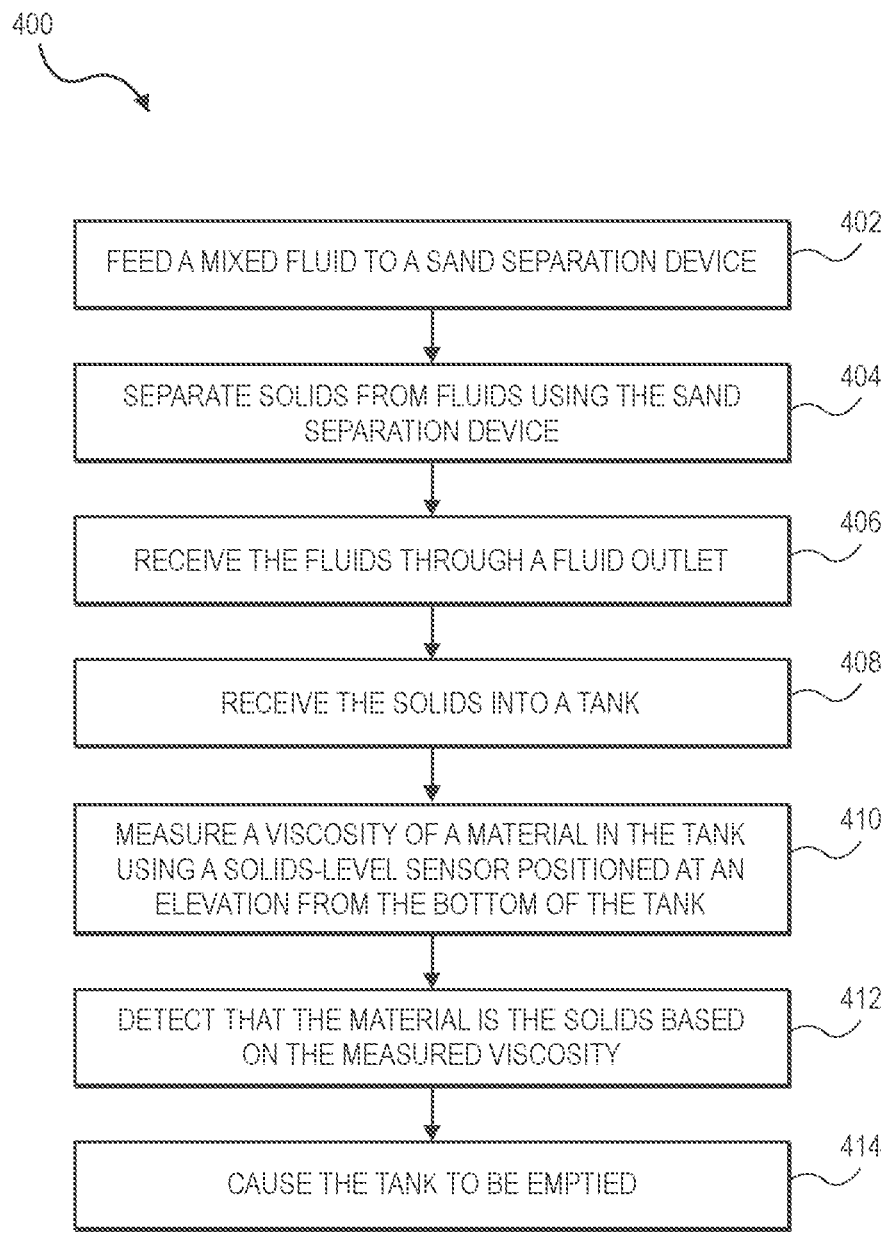
FIG. 4 illustrates a flowchart of a sand separation method, according to an embodiment.

FIG. 4 illustrates a flowchart of a method 400 for sand separation, according to an embodiment. Additional reference is made to the embodiments of FIGS. 1A-3 for purposes of illustration; however, it will be appreciated that embodiments of the present method 400 may employ other structures. Further, the worksteps shown in FIG. 4 and described below may be performed in any order, as the order provided is merely an example unless otherwise expressly stated. Further, a single workstep may be separated into two or more distinct worksteps, and/or two or more worksteps may be combined into a single workstep.

The method 400 may include feeding a mixed fluid including a solid (e.g., particulate matter such as sand) and a fluid to a separation device 102, as at 402. The method 400 may also include separating the solid from the fluid using the separation device 102, as at 404. For example, the separation device 102 may be a cyclonic separator that is coupled to a tank 110. During a transient, start-up phase, the fluid and the sand may both be directed to the tank 110, until the tank 110 fills up with the combination of the fluid and solid. Thereafter, the separated fluid may flow out of the separator through a fluid outlet 106, as at 406, and solids separated therefrom may proceed through a second outlet 108 and settle toward the bottom of the tank 110, as at 408.

During operation of the separator device 102, the method 400 includes measuring a viscosity of a material within the tank that is in contact with a solids-level sensor 120 positioned at an elevation above a bottom 124 of the tank 110, as at 410. The solids-level sensor 120 may include, for example, a vibratory member 121 which may extend into the tank 110 and into physical contact with the material therein. The sensor 120 may be configured to measure the resonant frequency thereof, from which the viscosity of the material in contact with the vibratory member 121 may be calculated.

The method 400 includes detecting that the material is the solids based on the viscosity, as at 412. After the transient start-up phase, during a fill-up phase as shown in FIG. 2, the solids may begin to displace the fluid and fill the tank 110. At some point, the solids may rise to the level of the sensor 120, and thus the sensor 120 may measure the viscosity of the solids, which may be one or more orders of magnitude higher than the viscosity of the fluid.

In response to measuring the viscosity that indicates the presence of solids at the level of the solids-level sensor 120, the method 400 includes causing the tank 110 to be emptied, as at 414. In some embodiments, this may be mechanized/automated, such that a controller 130 that receives signals from the sensor 120 representing the viscosity of the material being measured, may cause a blowdown valve 132 to open and blowdown the tank 110. In other embodiments, however, the controller 130 may sound an alarm or simply visualize the sensor 120 reading so that an operator can take actions to blowdown the tank 110. These are just two examples, however, of causing the blowdown of the tank 110, and others process may be employed within the scope of the present disclosure.

In some embodiments, two or more solids-level sensors 120, 150 may be provided (e.g., as shown in FIG. 1B). In such embodiments, the method 400 may include measuring the viscosity of the material within the tank 110 that is in contact with the second solids-level sensor 150 positioned at a second elevation above a bottom 124 of the tank 110, the second elevation being lower than the first elevation of the solids-level sensor 120. The method 400 in this embodiment may also include continuing to fill the tank 110 with solids in response to the second solids-level sensor measuring the viscosity associated with solids. That is, the second solids-level sensor 150 may provide a warning, but may not require immediate blowdown. In other embodiments, the method 400 may cause a blowdown in response to either the first or second solids-level sensors 120, 150 measuring the viscosity of sand.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A separation system, comprising:
a separation device comprising a mixed fluid inlet, a first outlet, and a second outlet;
a tank coupled to the second outlet and configured to receive a solid from the separation device via the second outlet;
a first solids-level sensor extending through the tank and positioned at an elevation above a bottom of the tank, wherein the first solids-level sensor is configured to detect a viscosity of a material within the tank at the elevation;
a second solids-level sensor extending through the tank and positioned at the elevation at which the first solids-level sensor is positioned and circumferentially offset therefrom around the tank, the second solids-level sensor being configured to detect the viscosity of the material in the tank; and
a controller in communication with the first and second solids-level sensors and configured to cause the tank to be emptied in response to receiving a signal representing that the solid has reached the elevation within the tank, wherein the controller is configured to determine a difference between a transient value of the signal and a true change in viscosity of the material in the tank based on a viscosity value represented by the signal, a time at which the signal represents a change in viscosity, or both.

2. The system of claim 1, wherein the separation device comprises a cyclonic separator and is positioned on the tank.

3. The system of claim 1, wherein the tank comprises a high-pressure vessel configured to contain a pressure of at least about 5,000 psi.

4. The system of claim 1, wherein the first solids-level sensor comprises a vibratory sensor comprising a vibrating element having a resonant frequency that changes depending on the viscosity of the material within the tank.

5. The system of claim 1, wherein the tank is configured to be filled with fluid from the separation device, and wherein, when the tank is filled with the fluid, the separation device is configured to provide substantially only the solid into the tank, such that a level of the solid in the tank rises over a time during which the separation device is operated.

6. The system of claim 5, wherein the first and second solids-level sensors are each configured to provide a signal representing that the solid has reached the elevation within the tank.

7. The system of claim 6, further comprising a controller in communication with the first and second solids-level sensor and configured to cause the tank to be emptied in response to receiving the signal representing that the solid has reached the elevation within the tank.

8. The system of claim 1, further comprising a third solids-level sensor positioned lower than the elevation at which the first solids-level sensor is positioned, the third solids-level sensor being configured to detect the viscosity of the material in the tank.

9. A sand separation method, comprising:
introducing a mixed fluid comprising a solid and a fluid to a separation device;
separating the solid from the fluid using the separation device;
directing the fluid from the separation device to a fluid outlet;
receiving the solid separated from the fluid into a tank;
measuring a viscosity of a material within the tank that is in contact with a first solids-level sensor positioned at an elevation above a bottom of the tank;
measuring the viscosity of the material within the tank that is in contact with a second solids-level sensor position at the elevation above the bottom of the tank, the first and second solids-level sensors being circumferentially offset from one another;
detecting that the material is the solids based on the viscosity measured by either the first solids-level sensor or the second solids-level sensor, wherein detecting comprises:
receiving, using a controller, a signal from the first solids-level sensor, the second solids level sensor, or both representing that the solid has reached the elevation within the tank; and determining, using the controller, that the signal represents a true change in viscosity of the material in the tank and not a transient change based on a viscosity value represented by the signal, a time at which the signal represents a change in viscosity, or both; and causing the tank to be emptied in response to detecting that the material is the solids.

10. The method of claim 9, further comprising directing the fluid from the separation device to the tank until the tank is full, wherein receiving the solid separated from the fluid comprises allowing the solid to settle toward the bottom of the tank.

11. The method of claim 9, wherein the first solids-level sensor comprises a vibratory sensor extending through a sidewall of the tank.

12. The method of claim 9, wherein causing the tank to be emptied comprises:
sending a signal from the first solids-level sensor, the second solids-level sensor, or both to the controller;
sending a signal from the controller to a blowdown valve coupled to the tank; and
opening the blowdown valve in response to receiving the signal from the controller, wherein opening the blowdown valve causes the tank to be emptied.

13. The method of claim 9, wherein causing the tank to be emptied comprises:
sending a signal from the first solids-level sensor, the second solids-level sensor, or both to a controller; and
alerting a user to blowdown the tank.

14. The method of claim 9, wherein the elevation is between about ⅓ and about ⅘ of a height of the tank.

15. The method of claim 14, comprising measuring the viscosity of the material within the tank that is in contact with a third solids-level sensor positioned at a second elevation above a bottom of the tank, the second elevation being lower than the elevation at which the first solids-level sensor is positioned.

16. The method of claim 15, further comprising continuing to fill the tank with solid in response to the third solids-level sensor measuring the viscosity associated with solid.

17. The method of claim 9, wherein the solid comprises sand, and wherein the fluid comprises water, hydrocarbon, or both.

18. A separation system, comprising:
a cyclonic separation device comprising a mixed fluid inlet, a first outlet, and a second outlet, the cyclonic separation device being configured to receive a mixed fluid through the inlet, and to provide a separated fluid through the first outlet;
a tank coupled to the second outlet and configured to receive a solid from the separation device via the second outlet, wherein the tank comprises a high-pressure vessel configured to contain a pressure of at least about 5,000 psi, wherein the tank is configured to be filled at least partially with fluid from the separation device, and wherein, when the fluid reaches a connection with the second outlet, the separation device is configured to provide substantially only solids into the tank, such that a level of solids in the tank rises over time;
a first solids-level sensor extending through the tank and positioned at a first elevation above a bottom of the tank, wherein the first solids-level sensor is configured to detect a viscosity of a material within the tank at the first elevation, wherein the first solids-level sensor comprises a vibratory sensor including a vibrating element having a resonant frequency that changes depending on the viscosity of the material within the tank, and wherein the first solids-level sensor is configured to provide a signal representing the viscosity of the material in the tank at the first elevation;
a second solids-level sensor extending through the tank and positioned at the first elevation and circumferentially offset around the tank from the first solids-level sensor, wherein the second solids-level sensor is configured to detect the viscosity of the material within the tank at the first elevation, and wherein the second solids-level sensor is configured to provide a signal representing the viscosity of the material in the tank at the first elevation, such that a combination of the first and second solids-level sensors is configured to detect an uneven increase in a level of sand in the tank; and
a controller in communication with the first and second solids-level sensors and configured to cause the tank to be emptied in response to the signal provided by the first solid-levels sensor or the second solids-level sensor representing that the material is sand, wherein the controller is further configured to determine a difference between a transient value of the signal provided by the first solid-levels sensor or the second solids-level sensor and a true change in viscosity of the material in the tank based on a viscosity value represented by the signal provided by the first solid-levels sensor or the second solids-level sensor, a time at which the signal provided by the first solid-levels sensor or the second solids-level sensor represents a change in viscosity, or both.

19. The system of claim 18, further comprising a third solids-level sensor extending through the tank and positioned at a second elevation above the bottom of the tank, the second elevation being lower than the first elevation, wherein the third solids-level sensor is configured to send a second signal to the controller, the signal representing the viscosity measured by the third solids-level sensor.

* * * * *